United States Patent
Soukup

(10) Patent No.: US 7,293,253 B1
(45) Date of Patent: Nov. 6, 2007

(54) TRANSPARENT INTERFACE MIGRATION USING A COMPUTER-READABLE MAPPING BETWEEN A FIRST INTERFACE AND A SECOND INTERFACE TO AUTO-GENERATE AN INTERFACE WRAPPER

(75) Inventor: Martin Soukup, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 662 days.

(21) Appl. No.: 10/660,534

(22) Filed: Sep. 12, 2003

(51) Int. Cl.
*G06F 9/44* (2006.01)
(52) U.S. Cl. ...................... 717/108; 717/116
(58) Field of Classification Search ............... 717/116, 717/108, 121; 719/316, 315, 319, 330; 718/100, 718/107
See application file for complete search history.

(56) References Cited

U.S. PATENT DOCUMENTS

| | | | | |
|---|---|---|---|---|
| 6,006,279 | A * | 12/1999 | Hayes | 719/328 |
| 6,047,280 | A * | 4/2000 | Ashby et al. | 707/2 |
| 6,105,119 | A * | 8/2000 | Kerr et al. | 711/219 |
| 6,173,277 | B1 * | 1/2001 | Ashby et al. | 707/1 |
| 6,370,539 | B1 * | 4/2002 | Ashby et al. | 707/102 |
| 6,405,364 | B1 * | 6/2002 | Bowman-Amuah | 717/101 |
| 6,415,334 | B1 * | 7/2002 | Kanamori | 719/316 |
| 6,477,701 | B1 * | 11/2002 | Heistermann et al. | 717/108 |
| 6,883,172 | B1 * | 4/2005 | Angeline et al. | 719/315 |
| 6,981,255 | B2 * | 12/2005 | Kanamori | 718/100 |
| 6,996,826 | B2 * | 2/2006 | Kanamori | 719/316 |
| 7,039,919 | B1 * | 5/2006 | Hunt | 719/316 |
| 7,069,562 | B2 * | 6/2006 | Kushnirskiy et al. | 719/328 |
| 7,072,934 | B2 * | 7/2006 | Helgeson et al. | 709/203 |
| 7,093,200 | B2 * | 8/2006 | Schreiber et al. | 715/835 |
| 7,191,236 | B2 * | 3/2007 | Simpson-Young et al. | 709/228 |
| 7,200,599 | B2 * | 4/2007 | Simon et al. | 707/100 |

OTHER PUBLICATIONS

Using the SNAP Development Environment, Template Software, 1998, Chapters 1-6 and 13 pages of Chapter 7.*
Using the SNAP Permanent Storage Component, Template Software, 1998, Chapters 1-4.*
"Using the SNAP Communication Component", Template Software, 1998, Whole Manual.*
Using the Web Component, Template Software, Template Software, 1997, Chapters 1-3.*
Enterprise Application Integration with XML and JAVA, by J.P. Morgenthal et al, 2001, Chapter 5.*
Object-Oriented Information Systems Planning and Implementation, David A. Taylor, Apr. 10,1992, pp. 296-299.*
Template Software, Foundation Template SNAP, Application Developer's Training Course, SNAP 8.0 1998, pp. 1-16.*

(Continued)

*Primary Examiner*—Todd Ingberg

(57) ABSTRACT

For a software application that uses a first interface, a method is provided to allow the migration of the software application to a second interface instead of the first interface. The software application may, in some situations, be migrated without having to modify the software application. The method involves the creation of a computer-readable mapping between the first interface and the second interface. The computer-readable mapping is then run through auto-generation software which automatically generates an interface wrapper. The interface wrapper can be used in a system to allow a legacy application to continue to use a legacy interface while a new application uses a new interface. The interface wrapper allows the software application to transparently communicate with the second interface. The details of the auto-generation software are also specified.

15 Claims, 8 Drawing Sheets

OTHER PUBLICATIONS

Castor Cures Your Data Binding Ills Author: Thomas Hammell http://www.developer.com/java/data/print.php/1730911, Feb. 27, 2003.

Dennis Sosnoski, "JiBX : Binding XML to JAVA Code—What is JiBX?", 1 page, http://jibx.sourceforge.net, available since at least as early as Sep. 3, 2003.

Dennis Sosnoski, "JiBX : Binding XML to JAVA Code—Flexibility", 1 page, http://jibx.sourceforge.net/performance.html, available since at least as early as Sep. 3, 2003.

Dennis Sosnoski, "JiBX : Binding XML to JAVA Code—Performance", 2 pages, http://jibx.sourceforge.net/performance.html, available since at least as early as Sep. 3, 2003.

Dennis Sosnoski, "JiBX : Binding XML to JAVA Code—Clean code", 1 page, http://jibx.sourceforge.net/clean-code.html, available since at least as early as Sep. 3, 2003.

Dennis Sosnoski, "XML and Java technologies : Data binding, Part 2 : Performance", 11 pages, http://www-106.ibm.com/developerworks/library/x-databdopt2/, Jan. 1, 2003.

Sun Microsystems JAVA website, "Java Architecture for XML Binding (JAXB)", 2 pages, http://java.sun.com/xml/jaxb, available since at least as early as Sep. 3, 2003.

* cited by examiner

TRANSPARENT INTERFACE MIGRATION USING A COMPUTER-READABLE MAPPING BETWEEN A FIRST INTERFACE AND A SECOND INTERFACE TO AUTO-GENERATE AN INTERFACE WRAPPER

FIELD OF THE INVENTION

The invention relates to computer software and is particularly concerned with a method, system and software for interface migration.

BACKGROUND OF THE INVENTION

Historically, computer software applications were self-contained, and were sometimes referred to as centralized or monolithic. This meant that a software application consisted of a single executable file or several executable files that were chained together. In general, all of the executable files associated with an application were only used for that particular application.

However, with the introduction of libraries, code re-use and client-server models for computing, the component model of computing evolved. With the rise of object-oriented programming languages and client-server computing, the component model led to distributed architectures, where the focus shifted to the management of components and widely dispersed computing resources.

Unlike the centralized model noted above, where an executable file was only intended to be used for a particular application, with the component model, programs are written as software components (sometimes hereinafter referred to as "components") that can be assembled into applications. A component can be reused by many programmers and different applications, saving software coding time, among other advantages.

For an application to use a component (or any distributed piece of software), the application communicates with the component through the component's interface. Typically, an interface requires certain inputs and provides certain outputs. If an application is receiving information from a component, the application must understand what the information means. If an application is providing information to a component, the application must provide information in a manner that the component is expecting.

When an application is written, the programmer codes the application knowing what information must be passed to each component and the programmer understands what information each component returns. However, if, for example, an application uses components from a graphics library, and if the components are updated, but the application is not updated, the application may no longer function properly, or at all, if the updated versions of the components now either pass different information (or a different type of information) to the application or require different information from the application.

Typically, when a newer version of a component is introduced, such that it now requires or sends information different from the previous version, each application that uses the component is modified through hand-coding, in a one-off fashion, to accommodate the change to the component. In other words, a new version of a component has historically required a corresponding upgrade to each application that uses the component and then redeployment. Amending an application's code in this manner is time consuming, and therefore expensive. It is also error-prone. If many applications use the same components, all of the applications must be updated, or else risk not working properly. Moreover, there is typically no record (and no standard for such a record) indicating what changes were made or how the changes were made. Accordingly, it is often difficult for anyone else reviewing the modified code to determine exactly what changes were made.

SUMMARY OF THE INVENTION

According to a first aspect, the invention provides a method to allow the migration of a software application from a first interface to a second interface. The method involves the creation of a computer-readable mapping between the first interface and the second interface. The mapping could be from the first interface to the second interface or vice versa, as appropriate. The computer-readable mapping is then run through an auto-generator which automatically generates an interface wrapper. The interface wrapper then replaces the first interface thereby interposing the interface wrapper between the software application and the second interface. The interface wrapper may allow for either backward compatibility or forward compatibility.

According to another aspect, the invention provides software for automatically generating an interface wrapper as described above, when given a mapping as input between a first interface and a second interface.

According to another aspect, the invention provides a system adapted to assist with the migration of a software application from a first interface to a second interface. The system has a processing platform and software for automatically generating an interface wrapper (which software may be referred to as "auto-generation software"). The system is adapted to receive a computer-readable mapping from the first interface to the second interface as an input to the auto-generation software. The system is adapted to execute instructions from the auto-generation software to produce an interface wrapper to allow the software application to transparently communicate with the second interface.

According to still another aspect of the present invention, there is provided for a software application that uses a first interface related to a first piece of software code, a method of migrating the software application to allow the software application to use a second interface instead of the first interface, the method comprising: creating a computer-readable mapping between the first interface and the second interface; running the mapping through an auto-generator, wherein the auto-generator uses the mapping to automatically generate an interface wrapper; outputting the interface wrapper to replace the first interface and the first piece of software code, thereby interposing the interface wrapper between the software application and the second interface; wherein the interface wrapper allows the software application to communicate with the second interface instead of the first interface.

According to yet another aspect of the present invention, there is provided a system adapted to assist with the migration of a software application from a first interface to a second interface, the system comprising a interface to a second interface, the system comprising a processing platform and a computer-readable medium comprising auto-generation software, the system being adapted to receive a computer-readable mapping from the first interface to the second interface, the processing platform being adapted to execute instructions of the auto-generation software to process the mapping to output an interface wrapper wherein the interface wrapper allows the software application to transparently communicate with the second interface.

According to a further aspect of the present invention, there is provided a computer-readable medium containing instructions for automatically generating and outputting an interface wrapper to facilitate migration of a software application from a first interface to a second interface, wherein, given a computer-readable mapping from the first interface to the second interface, the instructions comprise: a) for each class in the first interface a-1) from all classes to be included in the interface wrapper mapped from the class in the first interface, select a master class to hold handles to all other classes in the interface wrapper mapped from the class in the first interface; b) for each class to be included in the interface wrapper as set out in the computer-readable mapping; b-1) if the class to be included in the interface wrapper is the master class, initialize all the handles in the master class; b-2) for each attribute in the class to be included in the interface wrapper; b-2-1) add code from the computer-readable mapping related to the attribute to the class to be included in the interface wrapper; b-3) for each method in the class to be included in the interface wrapper; b-3-1) add code from the computer-readable mapping related to the method to the class to be included in the interface wrapper.

According to yet a further aspect of the present invention, there is provided a computer-readable medium containing instructions for automatically generating and outputting an interface wrapper to facilitate migration of a software application from a first interface to a second interface, wherein, given a computer-readable mapping from the first interface to the second interface, the instruction comprise: for each class to be included in the interface wrapper as set out in the computer-readable mapping, a) define the class to be included in the interface wrapper; b) for each class from the first interface mapped to the class to be included in the interface wrapper as set out in the computer readable mapping; b-1) upon determining that the class from the first interface is mapped only to the class to be included in the interface wrapper; b-1-1) add a member for the class from the first interface to the class to be included in the interface wrapper; b-1-2) add construction of the member to all constructors in the class to be included in the interface wrapper; b-2) upon determining that the class from the first interface is not mapped only to the class to be included in the interface wrapper and upon determining that the class to be included in the interface wrapper is the first of all classes in the interface wrapper mapped from the class from the first interface as set out in the computer-readable mapping; b-2-1) designate the class to be included in the interface wrapper as a master class to hold handles to all other classes in the interface wrapper mapped from the class in the first interface; b-2-2) add a member for the class from the first interface to the class to be included in the interface wrapper; b-2-3) add construction of the member to all constructors in the class to be included in the interface wrapper; b-2-4) for each other class in the interface wrapper mapped from the class from the first interface; b-2-4-1) add a member for the other class in the interface wrapper to the master class; b-2-4-2) add construction of the other class in the interface wrapper to all constructors in the master class; b-2-4-3) add a call to initialize the member wherein the member will know that the class to be included in the interface wrapper is the master class in all constructors of the other class in the interface wrapper; b-2-4-4) add a method to the other class in the interface wrapper to retrieve the member by a type name of the other class; b-3) upon determining that the class from the first interface is not mapped only to the class to be included in the interface wrapper and upon determining that the class to be included in the interface wrapper is not the first of all classes in the interface wrapper mapped from the class from the first interface as set out in the computer-readable mapping; b-3-1) add a member for the master class to the class to be included in the interface wrapper; b-3-2) add a method to the class to be included in the interface wrapper to allow the member to be initialized to point to the master class; b-3-3) add a method to the class to be included in the interface wrapper to retrieve the member; c) for each attribute in the class to be included in the interface wrapper; c-1) add code from the computer-readable mapping related to the attribute to the class to be included in the interface wrapper; d) for each method in the class to be included in the interface wrapper; d-1) add code from the computer-readable mapping related to the method to the class to be included in the interface wrapper.

Advantageously, different embodiments of the present invention may permit: easier migration of an application to a new or different interface; the provision of a written record or definition of mapping from one interface to another; retrofitting of a legacy application to new interface technology with minimal investment (in time and cost); reducing the likelihood of errors in the migration; and the ability to support old and new applications at the same time.

BRIEF DESCRIPTION OF THE DRAWINGS

Preferred embodiments of the invention will now be described with reference to the attached drawings in which:

FIG. 2a is a high-level, block diagram, illustrating mapping from one interface to another, in accordance with an embodiment of the present invention, where the cardinality of all aspects of the mapping is 1-to-1;

FIG. 2b is a high-level, block diagram, illustrating mapping from one interface to another, in accordance with an embodiment of the present invention, where the cardinality of the object mapping is N-to-1 (where N=2) and the cardinality of the attribute and method mapping to 1-to-1;

FIG. 2c is a high-level, block diagram, illustrating mapping from one interface to another, in accordance with an embodiment of the present invention, where the cardinality of the object mapping is 1-to-N (where N=2) and the cardinality of the attribute and method mapping is 1-to-1;

FIG. 2d is a high-level, block diagram, illustrating mapping from one interface to another, in accordance with an embodiment of the present invention, where the cardinality of the object mapping is N-to-M (where N=2 and M=2), the cardinality of the method mapping is N-to-M and the cardinality of the attribute mapping is 1-to-1 (where either side of the relationship, as shown, could be an attribute or a method);

FIG. 2e is a high-level, block diagram, illustrating a mapping from one interface to another, in accordance with an embodiment of the present invention, where in one case, a new application communicates with a new interface, which in turn communicates with a legacy interface while a legacy application communicates with the legacy interface;

DETAILED DESCRIPTION OF THE PREFERRED EMBODIMENTS

Figure 1:
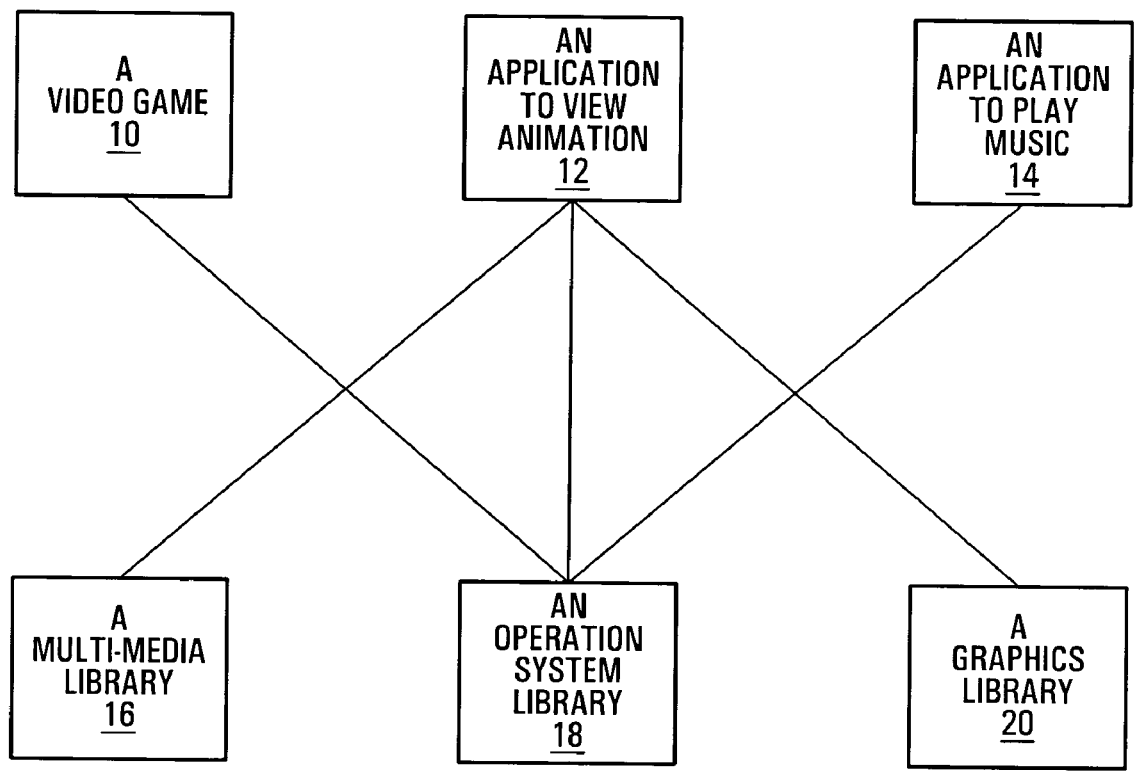
FIG. 1 is a schematic view of pieces of interacting software applications and components.

FIG. 1 is a schematic view of pieces of software code. While FIG. 1 does not illustrate any embodiments of the invention, FIG. 1 does provide context to show a situation where embodiments of the invention could be useful. The six pieces of software code shown in FIG. 1 could be on six different computers or they could all be resident on a single computer, or they could be resident on two or more computers. For the purpose of this example, the upper three pieces of computer code are software applications and the lower three pieces of computer code are software components that may be used by applications to perform one or more functions. Software components could include any kind of software applications such as those used in client/server environments or any library (which is an assembly of objects, routines, programs, etc.).

In this example, the upper three pieces of software code depicted in FIG. 1 are a video game application 10, an application to view animation 12, and an application to play music 14. The lower three pieces of software code in this example are the following libraries used by other applications: a multimedia library 16, an operating system library 18 and a graphics library 20. These pieces of software 16, 18 and 20 are examples of software components which could be used in a distributed environment. The multimedia library 16 includes objects, routines, and/or programs, etc. to be used by other applications. For example, the multimedia library 16 could include objects, routines, and/or programs for a variety of different purposes including those to produce or provide sounds, clipart, avatars, music, wallpaper, movies, icons, etc.

The operating system library 18 could include objects, routines, and/or programs for a variety of different purposes including those to provide support for accessing an external disk drive, opening and creating files, managing files, filenames, logging, processes, and threads, etc.

The graphics library 20 could include objects, routines, and/or programs for a variety of different purposes including those to provide dynamic creation of images, such as PNG and JPEG images, among other formats, or to provide graphical representations of numerical or statistical results, etc.

In this example, the three applications 10, 12, 14 use the operating system library 18. Only the application to view animation 12 uses the multimedia library 16. Similarly, only the application to view animation 12 uses the graphics library 20.

Each object, routine or program from a library has an interface, through which it communicates with an application. When an application is coded or written, it must understand what type of information the routine requires as inputs and it must understand what type of information is returned or modified by the routine. The application is written to expect a certain type of information. If the version of the routine is updated, and if the type of information that it returns is now different from that returned by the original version, the application will likely not be able to accept that information unless the application is specifically modified accordingly.

For example, if a routine in the multimedia library 16 is updated so that it no longer accepts the same parameters as the previous version, then the application to view animation 12 may no longer be able to use that routine unless the application to view animation 12 is updated accordingly or unless an "interface wrapper" as described below is created.

According to an aspect of the present invention, to allow all the applications that used an older version of a routine to continue to operate with the new version of the routine, an "interface wrapper" (which could also be called a "version aware interface proxy") is interposed between the new version of the routine and the application that uses or calls the routine. The interface wrapper allows the application to proceed without having to be aware that the routine or the routine's interface have been changed. In other words, the interface wrapper allows the application to proceed without any modifications (assuming, as noted below, that the functionality exposed by the new routine is a composite or aggregate of the functionality of the older version routines).

The interface wrapper is (typically) software that understands how the original routine's interface maps to the modified routine's interface. To create the interface wrapper, the inputs to and outputs from the original routine's interface are compared with the inputs to and outputs from the modified routine's interface. A mapping is then created.

The appropriate mapping, of course, depends upon differences between the interface of a new version of a routine and the interface of the previous (legacy) version. Some high-level examples are shown in FIGS. 2a-2e. These examples illustrate object-oriented systems, with differing cardinalities. However, the principles are equally applicable to functional (non-object oriented) environments.

Figure 2A:
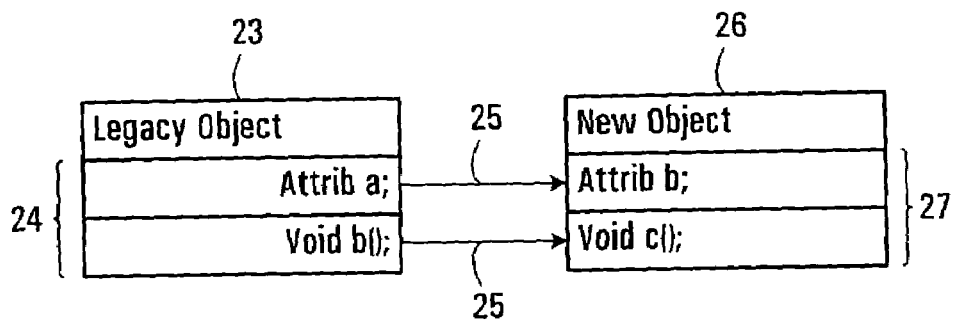
FIGS. 2a-2e are high-level, block diagrams, illustrating mappings from one or more legacy interfaces to one or more new (or different) interfaces, where the cardinality of the mapping is as follows.

FIG. 2a illustrates a 1-to-1 mapping 25 between a legacy interface 24 and a new interface 27. In this example, the mapping is trivial, since each interface 24, 27 relates to a single object having a single attribute and a single method. As shown in FIG. 2a, attribute a of the legacy object 23 maps to attribute b of the new object 26. Method b of the legacy object 23 maps to method c of the new object 26. In this example, only the names of the attribute and method have changed. From the perspective of an application relying upon a legacy interface 24 or a new interface 27, nothing has changed except the names of the attribute and method in the interface 27 of the new object 26. Because the functionality of the legacy object 23 and the new object 26 have remained the same, an interface wrapper need only reflect the change of names of the attribute and method.

Figure 2B:
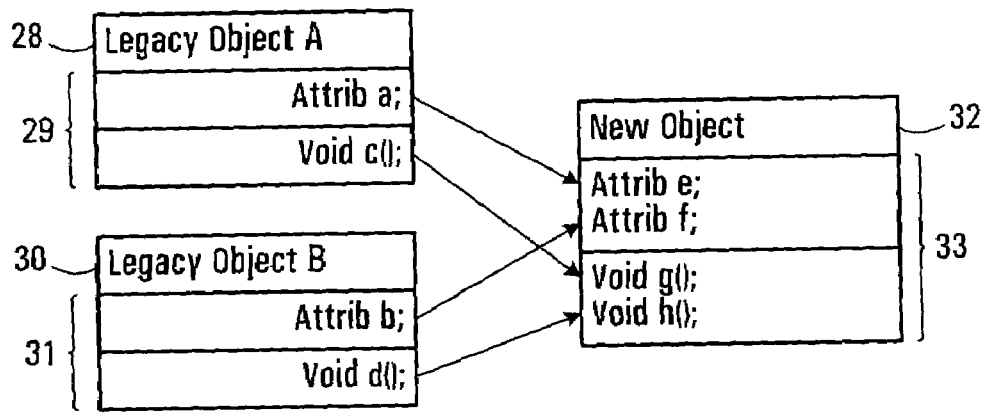

FIG. 2b illustrates an N-to-1 mapping between legacy and new interfaces, where N=2. More particularly, attribute a, in interface 29 of legacy object A maps to attribute e of interface 33 of new object 32. Method c in interface 29 of the legacy object A maps to method g of the interface 33 of the new object 32. Attribute b of interface 31 of the legacy object B maps to attribute f of the interface 33 of the new object 32. Method d in the interface 31 of the legacy object B maps to method h in the interface 33 of the new object 32. In this case, the attributes and methods of two legacy objects 28, 30 have been combined in a single new object 32.

Figure 2C:
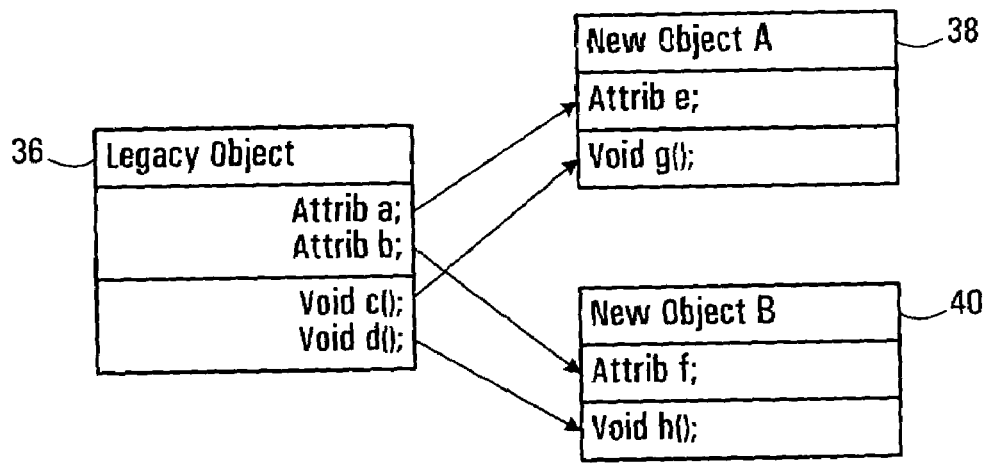

FIG. 2c illustrates a 1-to-N mapping between legacy and new interfaces, where N=2. In this case, the attributes and methods of a single legacy object 36 have been split between two new objects 38, 40.

Figure 2D:
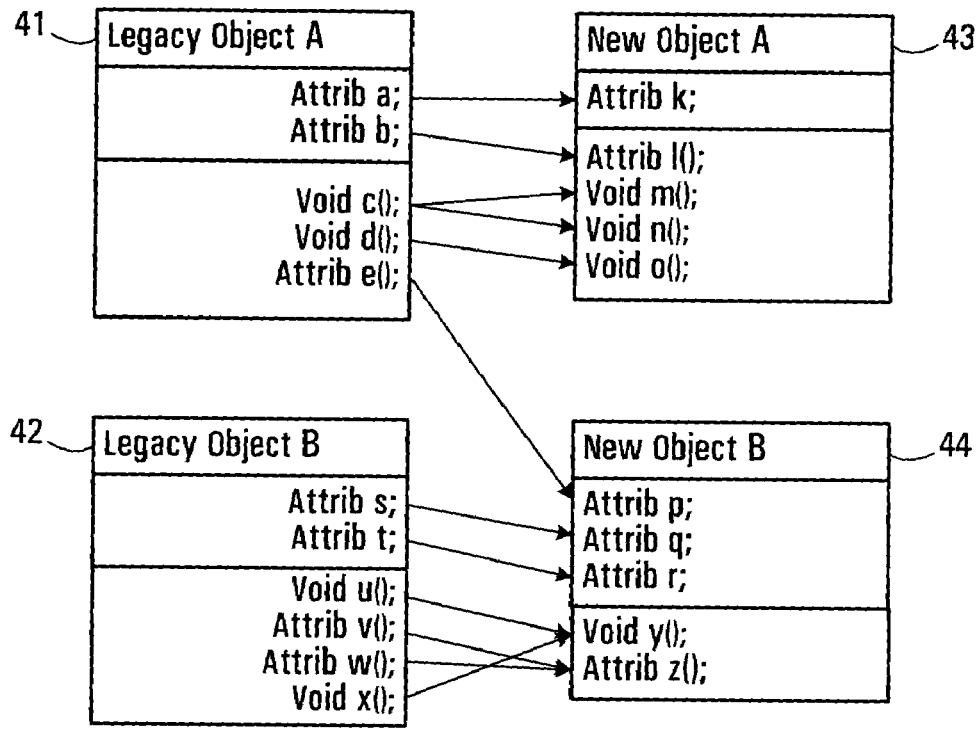

FIG. 2d illustrates an N-to-M mapping between the legacy interface and the new interface, where both N and M equal 2. However, in this case, unlike in the previous examples, there is no direct mapping possible between each attribute and method in legacy objects 41, 42 and each attribute and method in new objects 43, 44. The mapping in this example is therefore more complicated. In this example, there are cases where a single method or attribute in the new objects 43, 44 can only be ascertained by accessing or calling two attributes or methods in the legacy objects 41, 42 and vice versa.

FIG. 2d described above shows how a mapping, with multiple cardinality in both directions is handled. Although the general concepts will be discussed in greater detail below, a few preliminary points are worth noting. For each interface object or function that will be generated, only one static interface wrapper for the new interface is required (in the case of retrofitting a legacy application) and only one static interface wrapper for the new application is required for each interface object or function using a legacy interface. In the first case (retrofitting a legacy application), using the interface wrapper in this manner requires naming the interface wrapper with the name of the legacy interface, since the legacy application will continue to function based upon the premise that it is dealing with the legacy interface. Where the interface wrapper uses the same name as the legacy interface, versioning can be implemented with techniques known to those skilled in the art, using mechanisms such as CORBA versioning, for example.

Figure 2E:
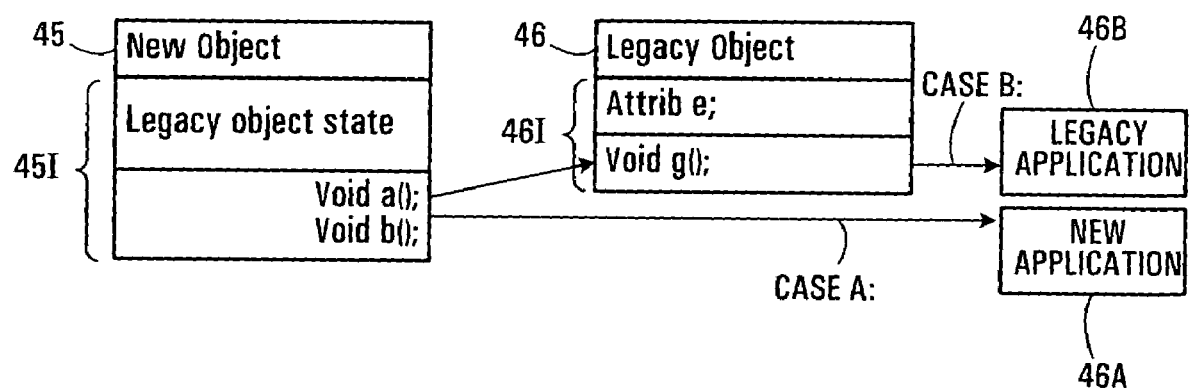

FIG. 2e illustrates a situation where the mapping is different in different situations. In case B, no mapping is required; a legacy application 46B simply references interface 46I of a legacy object 46. In case A, a new application 46A references an interface wrapper 45I of a new object 45, which interface wrapper 45I references the legacy interface 46I.

In other words, the legacy application uses the old functionality in the legacy interface 46I. In this example, where new capabilities have been added, the new interface 45I can use the existing legacy interface 46I underneath, but the new interface 45I can also introduce new capability, which in this example is the method void b( ). When the old functionality is requested by the new application, it calls the new interface 45I, which in turn uses the legacy interface 46I.

Figure 3A:
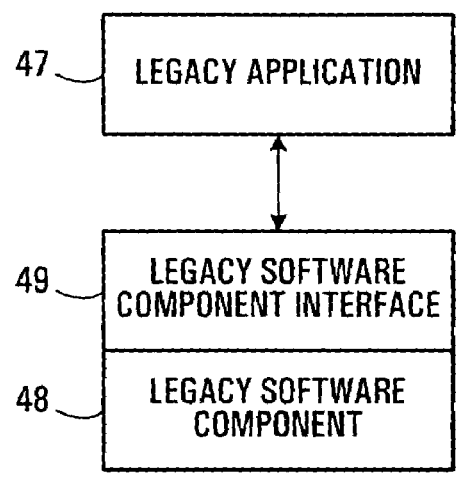
FIG. 3a is a block diagram of a legacy application which uses an interface of a legacy software component.

It may be helpful to demonstrate the principles referred to above first through a generic example and then through a more specific example. FIG. 3a is a block diagram of a legacy application 47 which uses a legacy software component 48, through an interface 49.

Figure 3B:
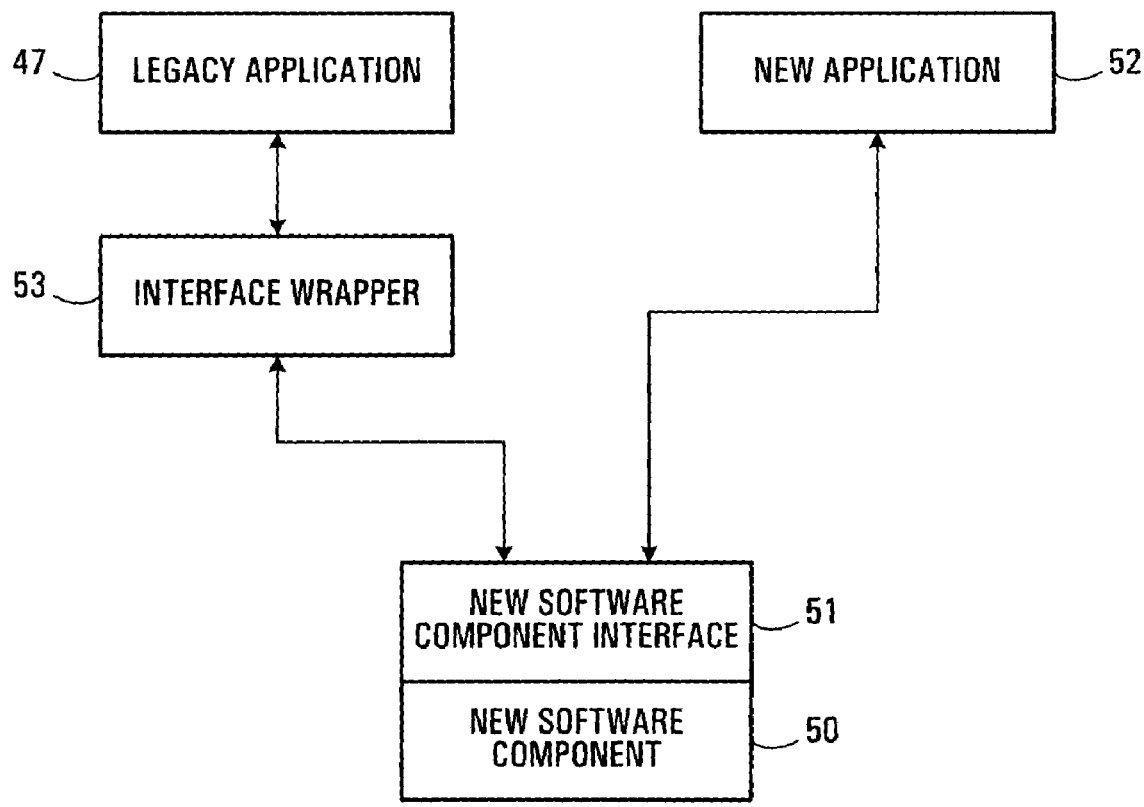
FIG. 3b is a block diagram where, in accordance with an embodiment of the present invention, the legacy software component has been replaced by a new software component and an interface wrapper has been interposed between the legacy application and the new software component.

FIG. 3b is a block diagram where the legacy software component 48 has been replaced by a new software component 50 (which, presumably, is an updated version of the legacy component 48) having an interface 51. In FIG. 3b, a new application 52 can communicate directly with the new software component interface 51. However, because the interface 51 for the new software component 50 is different from the interface 49 for the legacy software component 48, the legacy application cannot communicate directly with the new software component 50.

Accordingly, an interface wrapper 53 has been generated and interposed between the legacy application 47 and the new software component 50. The interface wrapper 53 has an interface, which, to the legacy application 47, appears the same as the interface 49 of the legacy component 48. The interface wrapper 53 acts as an intermediary between the legacy application 47 and the new software component 50, as more fully described below in the specific examples related to FIGS. 3c and 3d.

Figure 3C:
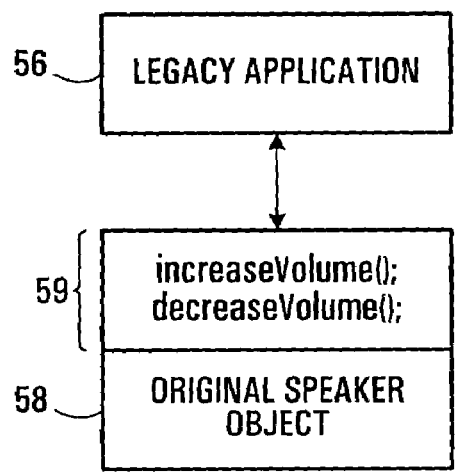
FIG. 3c is a block diagram of a legacy application which uses an original Speaker object.

FIG. 3c is a block diagram of a legacy application 56 which uses a Speaker object 58 having an interface 59 to increase and/or decrease the volume of an amplifier. In this example, the Speaker object 58 has a method increaseVolume which takes the current volume and increases it by 5 decibels. The Speaker object 58 also has a method decreaseVolume which takes the current volume and decreases it by 5 decibels.

Figure 3D:
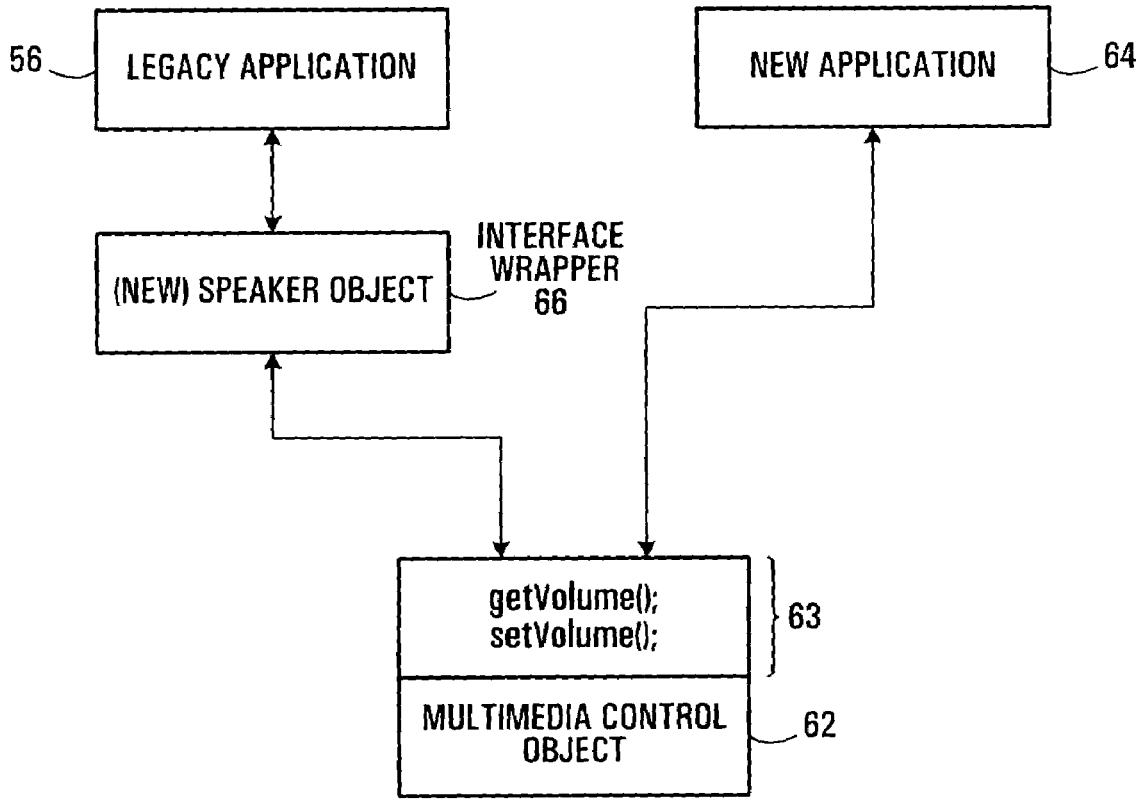
FIG. 3d is a block diagram where the original Speaker object shown in FIG. 3a has been replaced by a MultiMediaControl object and an interface wrapper, in accordance with an embodiment of the present invention.

In this example, as shown in FIG. 3d, the Speaker class or object 58 (from FIG. 3c) is updated and replaced by a new MultimediaControl class or object 62 having an interface 63. (For simplicity, both a class and its objects will be referred to by the same reference numeral.) The MultimediaControl class 62 has methods getVolume and setVolume. The method getVolume returns the current volume of the amplifier. The method setVolume sets the volume of the amplifier to the value passed to the method as its argument.

In this example, a new application 64 has been written with knowledge of the interface 63 associated with the MultiMediaControl class 62. The new application 64 need not concern itself with the original Speaker class 58 or the methods within that class. However, the legacy application 56 was written assuming that it would call or pass information to the original Speaker class or object 58, which now has been replaced. Because the new MultimediaControl class or object 62 does not have methods increaseVolume or decreaseVolume, an interface wrapper 66 has been generated and interposed between the legacy application 56 and the new MultiMediaControl object 62. The interface wrapper 66 understands the methods increaseVolume and decreaseVolume and can therefore act as an intermediary between the legacy application 56 and the new MultiMediaControl class or object 62.

To create the interface wrapper 66, it is necessary to map the relationship between the interface 59 of the original Speaker object 58 and the interface 63 of the new object, the MultiMediaControl object 62. In this example, the mapping can be defined as follows. If the legacy application 56 calls the method increaseVolume, then it is necessary to increase the volume of the amplifier by 5 decibels. If the legacy application 56 calls the method decreaseVolume, then it is necessary to decrease the volume by 5 decibels. The mapping could be written in UML, XML or any other computer-readable language. In XML, this mapping can be represented as follows:

```
<entity oldclass="Speaker" name="MultiMediaControl">
<method name="increaseVolume"
```

-continued

```
mapping="setVolume(getVolume( )+5)"/>
<method name="decreaseVolume"
mapping="setVolume(getVolume( )-5)"/>
</entity>
```

With this mapping, it is possible to create or generate an interface wrapper 66 for forward compatibility. In other words, after the MultimediaControl class 62 has been written and after defining the above mapping, it is now possible to generate the new Speaker class (which is the interface wrapper) 66 in Java code as follows. The interface wrapper 66 is generated using auto-generation code, as described below. The resulting interface wrapper 66, the new Speaker class, may appear as follows:

```
Class Speaker
{
private MultiMediaControl mmc;
public Speaker( ) { mmc = new MultiMediaControl( ); }
public void increaseVolume( ) {
mmc.setVolume(mmc.getVolume( )+5); }
public void decreaseVolume( ) {
mmc.setVolume(mmc.getVolume( )-5); }
}
```

Previously, the legacy application 56 called methods from within the original Speaker class 58. However, since original Speaker class 58 has been replaced, the legacy application 56 will now call methods from within the interface wrapper, namely the new Speaker class 66. The interface wrapper 66 takes the name of the legacy interface internally to maintain the image of being the legacy interface from the point of view of the legacy application 56. The interface wrapper, the (new) Speaker class 66, in turn calls methods from the new MultimediaControl class 62. These changes are entirely hidden from the legacy application 56.

The mapping shown above allows for forward compatibility where the legacy application 56 calls methods from the original Speaker class 58 that has been replaced. If the new class, MultimediaControl 62, relies upon methods or information from the legacy application 56 (ie: the new class or object 62 requires backward compatibility), then it will be necessary to create a new interface wrapper allowing for backward compatibility. To create a new interface wrapper for backward compatibility, it will first be necessary to create a new mapping, essentially the reverse of the mapping described above from the MultiMediaControl class 62 to the original Speaker class 58. Such a mapping could be accomplished by one skilled in the art, and will not be described further.

The mapping described above between an original interface and new interface (either backward compatible or forward compatible, or both, as necessary), may be created in XML, as shown in the example above, or may be written in another computer-readable form. Then, as described in greater detail below, in some embodiments, the mapping is run through auto-generation code to produce the interface wrapper code. The auto-generation code could be written using XSL templates, bean script, or XDoclet, for example (or another appropriate "language" of code generation engine).

In view of the above, by using the old names of objects, methods, variables, etc, and by using methods of data hiding, the auto generated code, the interface wrapper, can be plugged directly into the old development hierarchy and recompiled, if necessary. Recompilation is necessary only if required by the linking technology. For example, recompilation is not required in Java. As suggested above, the interface wrapper provides a single point of entry for each class in the new interface if the interface is object oriented. As noted above, while the examples concern object-oriented cases, embodiments of the invention are applicable to non-object oriented cases as well.

The above-noted example, as illustrated in FIGS. 3*c* and 3*d,* involves a case where a legacy interface 58 is replaced by a new interface 62. Accordingly, an interface wrapper (in this case the new Speaker class) 66 was generated, to allow the legacy application 56 to continue to operate, as though it was still communicating with the legacy interface 58.

Figure 4A:
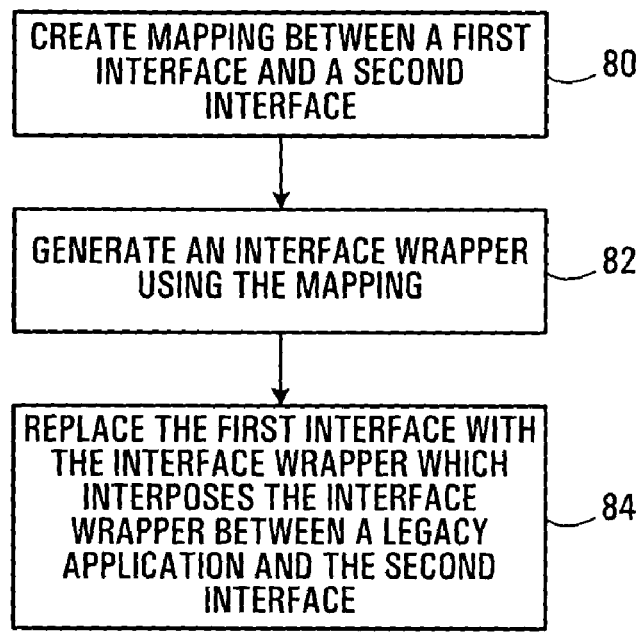
FIG. 4a is a flow chart illustrating steps to generate an interface wrapper between a legacy application and a second interface consistent with FIGS. 3b and 3d, in accordance with an embodiment of the present invention.

The above-noted example can also be seen as having the steps set out in the flow chart of FIG. 4*a*. The first step 80 shows the creation of a mapping between a first interface and a second interface, which in the example shown in FIGS. 3*c* and 3*d* is a mapping from the interface 59 of the original Speaker object 58 to the interface 63 of the MultiMediaObject 62.

The next step, as shown at block 82 of FIG. 4*a* is to generate an interface wrapper using the mapping from step 80. The following step, as shown at block 84 of FIG. 4*a* is to migrate the legacy application from the first interface to the second interface by replacing the first interface with the interface wrapper which interposes the interface wrapper between a legacy application and the second interface. This step 84 is consistent with FIG. 3*d* where the interface wrapper 66 is interposed between the legacy application 56 and the MultiMediaControl object 62.

Figure 3E:
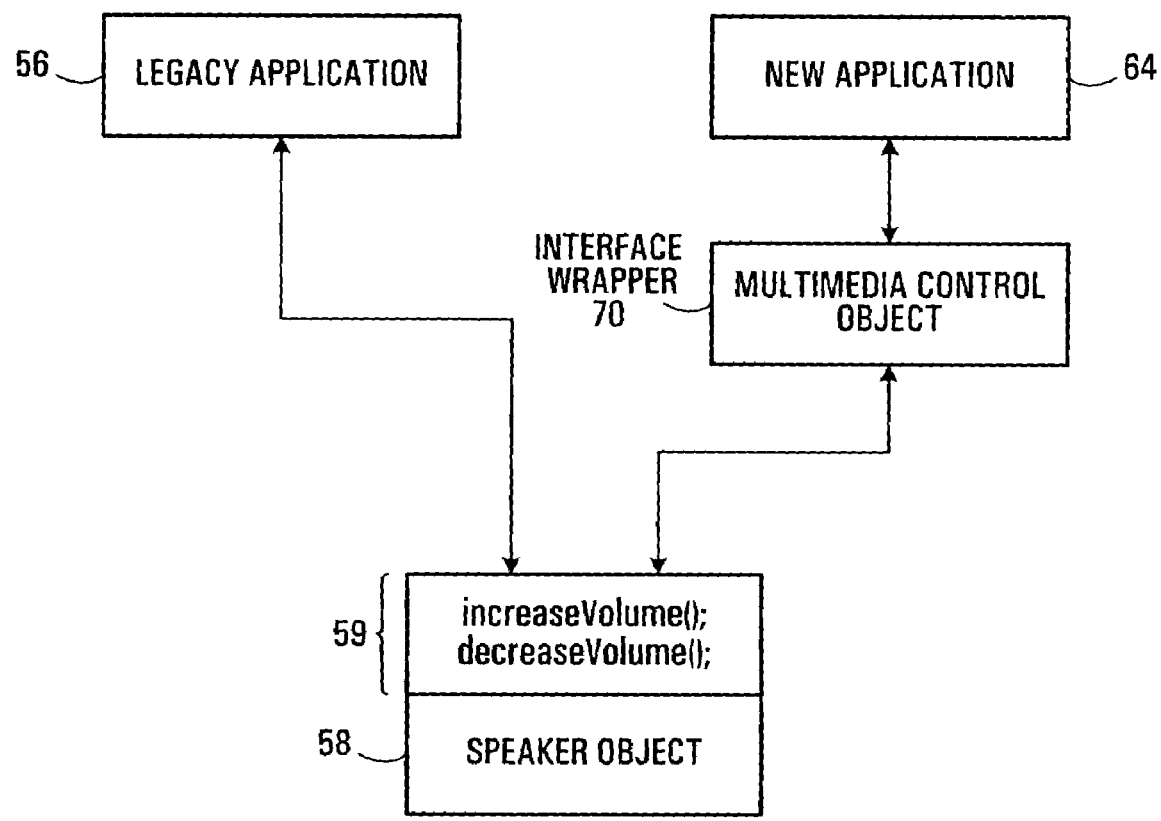
FIG. 3e is a block diagram where, in accordance with an embodiment of the present invention, an interface wrapper has been generated and interposed between a new application and the original Speak object, where the new application was created to communicate with a MultiMediaControl object.

A second, arguably related, example is shown in FIG. 3*e*. In this case, the legacy application 56 will continue to operate with the old interface, the (original) Speaker class or object 58. In other words, the original interface 59 will not be replaced. The new application 64 has been written (as before) to communicate with a new interface, MultiMedia-Control. For the purpose of this example, while the interface for MultiMediaControl is known, the underlying code for MultiMediaControl has not been written.

As demonstrated by this example, the new application 64 can continue to function without needing to manually develop an interface wrapper. As well, the new application 64 can function without having to modify it, assuming that the functionality exposed by the new interface MultiMedia-Control is a composite or aggregate of the functionality of the old interface, the (original) Speaker class 58. This will require the generation of an interface wrapper 70. The interface wrapper 70 will allow the new application 64 to communicate with the interface wrapper 70, without the new application 64 knowing of the existence of the underlying original Speaker interface 58. The code for the original Speaker class 58 is as follows:

```
class Speaker {
  private int volume = 0;
  public int MAX_VALUE = 100;
  public void increaseVolume( ) {
    if(volume+5<=MAX_VOLUME) volume+=5;
    else throw new Exception("MAXIMUM VOLUME EXCEEDED");
  }
  public void decreaseVolume( ) {
    if(volume>4) volume-=5;
    else throw new Exception("MINIMUM VOLUME EXCEEDED");
  }
}
```

The new application 64 is expecting to communicate with a MultimediaControl object having the methods setVolume and getVolume as described in the first example. Accordingly, it is first necessary to create a mapping from the original Speaker class 58 to the interface for the (as yet unwritten) MultiMediaControl class. Such a mapping, in XML, could be written as follows:

```
<entity name="MultiMediaControl" oldclass="Speaker">
<method name="setVolume" mapping="    int start = getVolume( );
        if(start==v) return;
        else if(start < v) {
            while(start < v) {
                spkr.increaseVolume( );
                start+=5;
            }
        }
        else {
            while(start > v) {
                spkr.decreaseVolume( );
                start-=5;
            }
        }"/>
<method name="getVolume" mapping="    int vol = 0;
        int ind = 0;
        try {
            while(1) {
                spkr.decreaseVolume( );
                vol+=5;
                ind++;
            }
        }catch (Exception e) {
        }
        for(int i=0;i<ind;i++) {
            spkr.increaseVolume( );
        }
        return vol;
    "/>
</entity>
```

It should be mentioned that the above-noted mapping could be achieved by a richer syntax. The above-noted mapping has been kept simple for example purposes. The mapping can now be run through the auto-generation program or software to produce the following interface wrapper, which in this case is the code for the MultiMediaControl class 70:

```
class MultiMediaControl {
    private Speaker spkr;
    public MultiMediaControl( ) { spkr = new Speaker( ); }
    public void setVolume(int v) {
        int start = getVolume( );
        if(start==v) return;
        else if (start < v) {
            while(start<v) {
                spkr.increaseVolume( );
                start+=5;
            }
        }
        else {
            while(start>v) {
                spkr.decreaseVolume( );
                start-=5;
            }
        }
    }
    public int getVolume( ) {
        int vol = 0;
        int ind = 0;
        try {
            while(1) {
                spkr.decreaseVolume( );
                vol+=5;
                ind++;
            }
        } catch (Exception e) {
        }
        for(int i=0; i<ind; i++) {
            spkr.increaseVolume( );
        }
        return vol;
    }
}
```

Figure 4B:
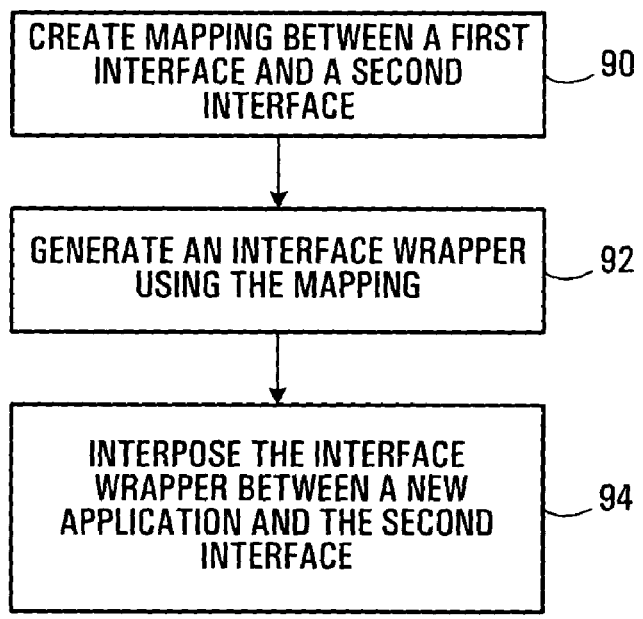
FIG. 4b is a flow chart illustrating steps to generate an interface wrapper between a new application and a legacy interface, consistent with FIG. 3e, in accordance with an embodiment of the present invention.

The above-noted example can also be seen as having the steps set out in the flow chart of FIG. 4b. The first step 90 shows the creation of a mapping between a first interface and a second interface, which in the example shown in FIG. 3e is a mapping from the interface 59 of the Speaker object 58 to the interface of the MultiMediaControl object (where the interface had been defined, but not the associated class). (It should be noted that when a mapping is described as being "between" one interface and another, no particular direction is being implied. In other words, a mapping between a first interface and a second interface could be from the first interface to the second interface or from the second interface to the first interface, as appropriate.)

The next step, as shown at block 92 of FIG. 4b is to generate an interface wrapper using the mapping from step 90. The following step, as shown at block 94 of FIG. 4b is to interpose the interface wrapper (that was generated at step 92) between an application and the second interface. This step 94 is consistent with FIG. 3e where the interface wrapper 70 is interposed between the application 64 and the Speak object 58.

Figure 5:
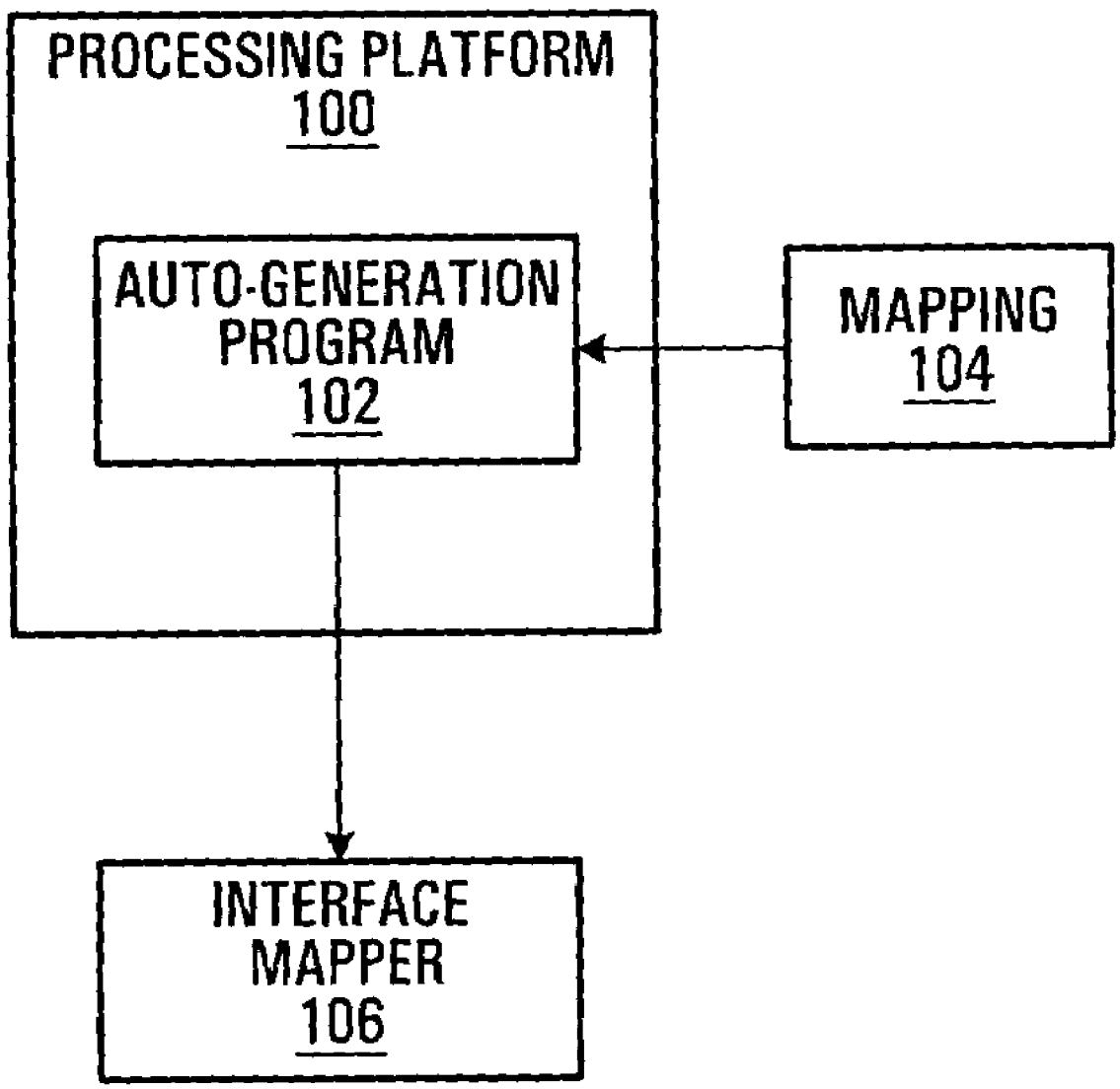
FIG. 5 is a schematic diagram illustrating a system for creating an interface wrapper, in accordance with an embodiment of the present invention.

The above noted examples and embodiments of the invention can be implemented on a system that includes a processing platform 100, as shown in the schematic view of FIG. 5. The processing platform 100 could be a general purpose computer or a specific-purpose computer or computer device. The processing platform 100 is equipped with an auto-generation program which could also be referred to as an auto-generator 102 containing instructions as described herein. The auto-generation program 102 could be implemented in hardware or in software on a computer-readable medium or as a combination of hardware and software.

The processing platform 100 receives as input a mapping 104. The mapping 104 could, for example, be in the form of a file stored on a diskette or other computer-readable medium.

Using the mapping 104 as an input to the auto-generation program 102, the processing platform 100 executes the instructions of the auto-generation program 102 to produce an interface wrapper 106.

As noted above, once a mapping or a mapping definition has been created in computer-readable code such as XML, auto-generation code automatically generates the interface wrapper. The auto-generation code could be written in many different ways. An example of instructions to be performed by the auto-generation code for object-oriented interfaces is shown below in pseudo code. The mapping definition describes the relationship between one or more source interfaces or source classes to one or more target interfaces or target classes (which may then be known as interfaces for the interface wrapper or interface wrapper classes):

for each target class
a) define class
b) for each source class
    b.1) if source class has one target
        b.1.1) add source member to target class
        b.1.2) add construction of source member to constructor(s)
    b.2) else if this is the first target
        b.2.1) add source member to target class
        b.2.2) for each target other than self
            b.2.2.1) add target member to class
            b.2.2.2) add target constructor to constructor(s)
            b.2.2.3) add call setTargetMaster on each constructed target class in constructor(s)
            b.2.2.4) add getTargetXXX method to retrieve this target (where XXX is the type of this target)
    b.3) else // there is more than one target and this target is not the master
        b.3.1) add getTargetMaster method
        b.3.2) add setTargetMaster method
    b.4) for each attribute
        b.4.1) substitute code or add source class access for attribute getter and setter methods
    b.5) for each method
        b.5.1) substitute code or call source class method This pseudo code will be briefly discussed by running through the first example described above with respect to FIGS. 3c and 3d, thereby illustrating how the interface wrapper, the new Speaker class 66, was generated. For ease of reference, the basic elements of the example are repeated here. As shown in FIG. 3c, the legacy application 56 previously used a Speaker object 58 to increase and/or decrease the volume of an amplifier. The original Speaker class 58 had a method increaseVolume which took a given volume and increased it by 5 decibels. The original Speaker class 58 also had a method decreaseVolume which took a given volume and decreased it by 5 decibels.

As mentioned above, the original Speaker class 58 was replaced by a new MultiMediaControl class 62 as shown in FIG. 3d. The MultiMediaControl class 62 has methods getVolume and setVolume. The method getVolume returns the current volume of the amplifier. The method setVolume sets the volume of the amplifier to the value passed to the method as its argument.

The following mapping, as noted above, was created in XML from the new interface to the original interface:

<entity oldclass="Speaker" name="MultiMediaControl">
<method name="increaseVolume" mapping="setVolume (getVolume( )+5)"/>
<method name="decreaseVolume" mapping="setVolume (getVolume( )−5)"/>
</entity>

Using the auto-generation pseudo code shown above, an interface wrapper, a new Speaker class 66, is generated as follows. Execution of the first two lines of the pseudo code:

for each target class
    define class will define the interface wrapper as follows:
    Class Speaker
    {

In this example, there is only one source class. This is the MultiMediaControl class that has an implementation to be relied upon to create the interface wrapper. In the XML mapping, the source class is given the name "MultiMedia-Control".

In the pseudo code, the partial instruction "if source class has one target class" determines if a piece of functionality (in this case the source class) is only used by one target class (as opposed to a case where two target classes use the same source class). In this example, the source class is only mapped to one target class. Therefore, the instruction "add source member to target class" is executed which adds a data member to the target class. In this example, this instruction will produce the following:
    private MultiMediaControl mmc Then the instruction "add construction of source member to constructor(s)" is executed which produces the following constructor:
    public Speaker ( ) {mmc=new MultiMediaControl( );}

In this example, there are no attributes. However, if there were attributes, the auto-generation code would cause the attributes to be defined and would then either just substitute the code as shown in the mapping or else add "get" or "set" attribute methods as determined by the mapping, through calling an appropriate method in the source class.

Under the code "for each method", the instruction "substitute code or call source class method" is executed which uses the defined mapping of each method in the XML code. For example, the XML mapping:

<method name="increaseVolume" mapping="setVolume (getVolume( )+5)"/> will produce the following in the interface wrapper 66:

public void increaseVolume( ) {mmc.setVolume (mmc.getVolume( )+5);}

The XML mapping:

<method name="decreaseVolume" mapping="setVolume (getVolume( )−5)"/> will produce the following in the interface wrapper 66:
public void decreaseVolume( ) {mmc.setVolume (mmc.getVolume( )−5;}

The "else" portions of the pseudo code were not used in this example. The method getTargetMaster is used to guarantee that all target classes from a source class are shared in a single bundle. It should be noted that in order to support multiple usages of a source class, a separate mapping file is needed for each independent usage. The method getTargetXXX is used to retrieve a specific target class instance with the type XXX. One target class is chosen as "master" to hold all the relevant instance handles in a single bundle.

Using different terminology, the pseudo code could also be written as follows:

for each class to be included in the interface wrapper as set out in the computer-readable mapping.
a) define the class to be included in the interface wrapper
b) for each class from the first interface mapped to the class to be included in the interface wrapper as set out in the computer readable mapping
    b.1) if the class from the first interface is mapped only to the class to be included in the interface wrapper
        b.1.1) add a member for the class from the first interface to the class to be included in the interface wrapper;
        b.1.2) add construction of the member to all constructors in the class to be included in the interface wrapper;

b.2) else if the class to be included in the interface wrapper is the first of all classes in the interface wrapper mapped from the class from the first interface as set out in the computer-readable mapping
  b.2.1) designate the class to be included in the interface wrapper as a master-mapped from the class in the first interface;
  b.2.2) add a member for the class from the first interface to the class to be included in the interface wrapper;
  b.2.3) add construction of the member to all constructors in the class to be included in the interface wrapper;
  b.2.4) for each other class in the interface wrapper mapped from the class from the first interface
    b.2.4.1) add a member for the other class in the interface wrapper to the master class;
    b.2.4.2) add construction of the other class in the interface wrapper to all constructors in the master class;
    b.2.4.3) add a call to initialize the member wherein the member will know that the class to be included in the interface wrapper is the master class in all constructors of the other class in the interface wrapper;
    b.2.4.4) add a method to the other class in the interface wrapper to retrieve the member by a type name of the other class;
  b.3) else
    b.3.1) add a member for the master class to the class to be included in the interface wrapper;
    b.3.2) add a method to the class to be included in the interface wrapper to allow the member to be initialized to point to the master class;
    b.3.3) add a method to the class to be included in the interface wrapper to retrieve the member;
c) for each attribute in the class to be included in the interface wrapper
  c.1) add code from the computer-readable mapping related to the attribute to the class to be included in the interface wrapper;
d) for each method in the class to be included in the interface wrapper
  d.1) add code from the computer-readable mapping related to the method to the class to be included in the interface wrapper.

At a higher level of abstraction, the above-noted pseudo code could be written as follows:
a) for each source class
  a.1) choose a master target class to hold all relevant instance handles in a single bundle
b) for each target class
  b.1) add initialization of all classes if this is the master target class
  b.2) insert attribute mapping code
  b.3) insert method mapping code.

Using different terminology, the pseudo code (showing a higher level of abstraction) could also be written as follows:
a) for each class in the first interface
  a.1) from all classes to be included in the interface wrapper mapped from the class in the first interface, select a master class to hold handles to all other classes in the interface wrapper mapped from the class in the first interface;
b) for each class to be included in the interface wrapper as set out in the computer-readable mapping
  b.1) if the class to be included in the interface wrapper is a master class, initialize all the handles in the master class;
  b.2) for each attribute in the class to be included in the interface wrapper
    b.2.1) add code from the computer-readable mapping related to the attribute to the class to be included in the interface wrapper;
  b.3) for each method in the class to be included in the interface wrapper
    b.3.1) add code from the computer-readable mapping related to the method to the class to be included in the interface wrapper.

Numerous modifications and variations of the present invention are possible in light of the above teachings. It is therefore to be understood that within the scope of the appended claims, the invention may be practised otherwise than as specifically described herein.

The invention claimed is:

1. For a software application that uses a first interface related to a first piece of software code, a method of migrating the software application to allow the software application to use a second interface instead of the first interface, the method comprising:
creating a computer-readable mapping between the first interface and the second interface;
running the mapping through an auto-generator, wherein the auto-generator uses the mapping to automatically generate interface wrapper;
outputting the interface wrapper to replace the first interface and the first piece of software code, thereby interposing the interface wrapper between the software application and the second interface;
wherein the interface wrapper allows the software application to communicate with the second interface instead of the first interface.

2. The method of claim 1, wherein the interface wrapper provides for at least one of (a) forward compatibility wherein the interface wrapper allows the software application to transparently communicate with the second interface and (b) backward compatibility wherein the interface wrapper allows the second interface to transparently communicate with the software application.

3. The method of claim 2, wherein for forward compatibility, creating the computer-readable mapping comprises creating a mapping from the first interface to the second interface.

4. The method of claim 2, wherein for backward compatibility, creating the computer-readable mapping comprises creating a mapping from the second interface to the first interface.

5. The method of claim 1, wherein the auto-generator, in an object-oriented environment, is software comprising the following instructions:
a) for each class in the first interface
  a-1) from all classes to be included in the interface wrapper mapped from the class in the first interface, select a master class to hold handles to all other classes in the interface wrapper mapped from the class in the first interface;
b) for each class to be included in the interface wrapper as set out in the computer-readable mapping
  b-1) if the class to be included in the interface wrapper is the master class, initialize all the handles in the master class;
  b-2) for each attribute in the class to be included in the interface wrapper b-2-1) add code from the computer-readable mapping related to the attribute to the class to be included in the interface wrapper;
b-3) for each method in the class to be included in the interface wrapper
b-3-1) add code from the computer-readable mapping related to the method to the class to be included in the interface wrapper.

6. The method of claim 1, wherein the auto-generator, in an object-oriented environment, is software comprising the following instructions for each class to be included in the interface wrapper as set out in the computer-readable mapping:
a) define the class to be included in the interface wrapper
b) for each class from the first interface mapped to the class to be included in the interface wrapper as set out in the computer readable mapping:
  b-1) upon determining that the class from the first interface is mapped only to the class to be included in the interface wrapper
    b-1-1) add a member for the class from the first interface to the class to be included in the interface wrapper;
    b-1-2) add construction of the member to all constructors in the class to be included in the interface wrapper;
  b-2) upon determining that the class from the interface is not mapped only to the class to be included in the interface wrapper and upon determining that the class to be included in the interface wrapper is the first of all classes in the interface wrapper mapped from the class from the first interface as set out in the computer-readable mapping:
    b-2-1) designate the class to be included in the interface wrapper as a master class to hold handles to all other classes in the interface wrapper mapped from the class in the first interface;
    b-2-2) add a member for the class from the first interface to the class to be included in the interface wrapper;
    b-2-3) add construction of the member to all constructors in the class to be included in the interface wrapper;
    b-2-4) for each other class in the interface wrapper mapped from the class from the first interface
      b-2-4-1) add a member for the other class in the interface wrapper to the master class;
      b-2-4-2) add construction of the other class in the interface wrapper to all constructors in the master class;
      b-2-4-3) add a call to initialize the member wherein the member will know that the class to be included in the interface wrapper is the master class in all constructors of the other class in the interface wrapper;
      b-2-4-4) add a method to the other class in the interface wrapper to retrieve the member by a type name of the other class;
  b-3) upon determining that the class from the first interface is not mapped only to the class to be included in the interface wrapper and upon determining that the class to be included in the interface wrapper is not the first of all classes in the interface wrapper mapped from the class from the first interface as set out in the computer-readable mapping;
    b-3-1) add a member for the master class to the class to be included in the interface wrapper;
    b-3-2) add a method to the class to be included in the interface wrapper to allow the member to be initialized to point to the master class;
    b-3-3) add a method to the class to be included in the interface wrapper to retrieve the member;
c) for each attribute in the class to be included in the interface wrapper
  c-1) add code from the computer-readable mapping related to the attribute to the class to be included in the interface wrapper;
d) for each method in the class to be included in the interface wrapper
  d-1) add code from the computer-readable mapping related to the method to the class to be included in the interface wrapper.

7. The method of claim 1, wherein the software application, the first interface and the second interface are written in the Java language.

8. The method of claim 1, wherein the computer-readable mapping is written in a language selected from one of XML and UML.

9. The method of claim 1, wherein the auto-generator is software written in a form selected from one of XSL templates, bean script and XDoclet.

10. The method of claim 1, wherein the software application is migrated from the first interface to the second interface without modifying the software application.

11. A system adapted to assist with the migration of a software application from a first interface to a second interface, the system comprising a processing platform and a computer-readable medium comprising auto-generation software, the system being adapted to receive a computer-readable mapping from the first interface to the second interface, the processing platform being adapted to execute instructions of the auto-generation software to process the mapping to output an interface wrapper wherein the interface wrapper allows the software application to transparently communicate with the second interface.

12. The system of claim 11, wherein the instructions of the auto-generation software comprises the following instructions:
a) for each class in the first interface
  a-1) from all classes to be included in the interface wrapper mapped from the class in the first interface, select a master class to hold handles to all other classes in the interface wrapper mapped from the class in the first interface;
b) for each class to be included in the interface wrapper as set out in the computer-readable mapping
  b-1) if the class to be included in the interface wrapper is the master class, initialize all the handles in the master class;
  b-2) for each attribute in the class to be included in the interface wrapper
    b-2-1) add code from the computer-readable mapping related to the attribute to the class to be included in the interface wrapper
  b-3) for each method in the class to be included in the interface wrapper
    b-3-1) add code from the computer-readable mapping related to the method to the class to be included in the interface wrapper.

13. The system of claim 11 wherein the instructions from the auto-generation software comprises the following instructions: for each class to be included in the interface wrapper as set out in the computer-readable mapping:

a) define the class to be included in the interface wrapper
b) for each class from the first interface mapped to the class to be included in the interface wrapper as set out in the computer readable mapping:
   b-1) upon determining that the class from the first interface is mapped only to the class to be included in the interface wrapper:
      b-1-1) add a member for the class from the first interface to the class to be included in the interface wrapper;
      b-1-2) add construction of the member to all constructors in the class to be included in the interface wrapper;
   b-2) upon determining that the class from the interface is not mapped only to the class to be included in the interface wrapper and upon determining that the class to be included in the interface wrapper is the first of all classes in the interface wrapper mapped from the class from the first interface as set out in the computer-readable mapping:
      b-2-1) designate the class to be included in the interface wrapper as a master class to hold handles to all other classes in the interface wrapper mapped from the class in the first interface;
      b-2-2) add a member for the class from the first interface to the class to be included in the interface wrapper;
      b-2-3) add construction of the member to all constructors in the class to be included in the interface wrapper;
      b-2-4) for each other class in the interface wrapper mapped from the class from the first interface
         b-2-4-1) add a member for the other class in the interface wrapper to the master class;
         b-2-4-2) add construction of the other class in the interface wrapper to all constructors in the master class;
         b-2-4-3) add a call to initialize the member wherein the member will know that the class to be included in the interface wrapper is the master class in all constructors of the other class in the interface wrapper;
         b-2-4-4) add a method to the other class in the interface wrapper to retrieve the member by a type name of the other class;
   b-3) upon determining that the class from the first interface is not mapped only to the class to be included in the interface wrapper and upon determining that the class to be included in the interface wrapper is not the first of all classes in the interface wrapper mapped from the class from the first interface as set out in the computer-readable mapping:
      b-3-1) add a member for the master class to the class to be included in the interface wrapper;
      b-3-2) add a method to the class to be included in the interface wrapper to allow the member to be initialized to point to the master class;
      b-3-3) add a method to the class to be included in the interface wrapper to retrieve the member;
c) for each attribute in the class to be included in the interface wrapper
   c-1) add code from the computer-readable mapping related to the attribute to the class to be included in the interface wrapper;
d) for each method in the class to be included in the interface wrapper
   d-1add code from the computer-readable mapping related to the method to the class to be included in the interface wrapper.

14. A computer-readable medium containing instructions for automatically generating and outputting an interface wrapper to facilitate migration of a software application from a first interface to a second interface, wherein, given a computer-readable mapping from the first interface to the second interface, the instructions comprise:
   a) for each class in the first interface
      a-1) from all classes to be included in the interface wrapper mapped from the class in the first interface, select a master class to hold handles to all other classes in the interface wrapper mapped from the class in the first interface;
   b) for each class to be included in the interface wrapper as set out in the computer-readable mapping
      b-1) if the class to be included in the interface wrapper is a master class, initialize all the handles in the master class;
      b-2) for each attribute in the class to be included in the interface wrapper
         b-2-1) add code from the computer-readable mapping related to the attribute to the class to be included in the interface wrapper;
      b-3) for each method in the class to be included in the interface wrapper
         b-3-1) add code from the computer-readable mapping related to the method to the class to be included in the interface wrapper.

15. A computer-readable medium containing instructions for automatically generating and outputting an interface wrapper to facilitate migration of a software application from a first interface to a second interface, wherein, given a computer-readable mapping from the first interface to the second interface, the instructions comprise: for each class to be included in the interface wrapper as set out in the computer-readable mapping,
   a) define the class to be included in the interface wrapper
   b) for each class from the first interface mapped to the class to be included in the interface wrapper as set out in the computer readable mapping
      b-1) upon determining that the class from the first interface is mapped only to the class to be included in the interface wrapper
         b-1-1) add a member for the class from the first interface to the class to be included in the interface wrapper;
         b-1-2) add construction of the member to all constructors in the class to be included in the interface wrapper;
      b-2) upon determining that the class from the interface is not mapped only to the class to be included in the interface wrapper and upon determining that the class to be included in the interface wrapper is the first of all classes in the interface wrapper mapped from the class from the first interface as set out in the computer-readable mapping
         b-2-1) designate the class to be included in the interface wrapper as a master class to hold handles to all other classes in the interface wrapper mapped from the class in the first interface;
         b-2-2) add a member for the class from the first interface to the class to be included in the interface wrapper;

b-2-3) add construction of the member to all constructors in the class to be included in the interface wrapper;

b-2-4) for each other class in the interface wrapper mapped from the class from the first interface b-2-4-1) add a member for the other class in the interface wrapper to the master class;

b-2-4-2) add construction of the other class in the interface wrapper to all constructors in the master class;

b-2-4-3) add a call to initialize the member wherein the member will know that the class to be included in the interface wrapper is the master class in all constructors of the other class in the interface wrapper;

b-2-4-4) add a method to the other class in the interface wrapper to retrieve the member by a type name of the other class;

b-3) upon determining that the class from the first interface is not mapped only to the class to be included in the interface wrapper and upon determining that the class to be included in the interface wrapper is not the first of all classes in the interface wrapper mapped from the class from the first interface as set out in the computer-readable mapping b-3-1) add a member for the master class to the class to be included in the interface wrapper;

b-3-2) add a method to the class to be included in the interface wrapper to allow the member to be initialized to point to the master class;

b-3-3) add a method to the class to be included in the interface wrapper to retrieve the member;

c) for each attribute in the class to be included in the interface wrapper c-1) add code from the computer-readable mapping related to the attribute to the class to be included in the interface wrapper;

d) for each method in the class to be included in the interface wrapper d-1 add code from the computer-readable mapping related to the method to the class to be included in the interface wrapper.

* * * * *

UNITED STATES PATENT AND TRADEMARK OFFICE
CERTIFICATE OF CORRECTION

PATENT NO.         : 7,293,253 B1
APPLICATION NO.    : 10/660534
DATED              : November 6, 2007
INVENTOR(S)        : Martin Soukup It is certified that error appears in the above-identified patent and that said Letters Patent is hereby corrected as shown below:

Claim 6, column 17, line 27: "...from the interface" should read --...from the <u>first</u> interface--

Claim 6, column 17, line 65: "...computer-readable mapping;" should read --...computer-readable mapping<u>:</u>--

Claim 12, column 18, line 58: "included in the interface wrapper" should read --included in the interface wrapper<u>;</u>--

Claim 13, column 19, line 14: "...from the interface" should read --from the <u>first</u> interface--

Claim 13, column 20, line 1: "d1add code from the..." should read --d-1<u>)</u> add code from the...--

Claim 15, column 20, line 54:: "...from the interface" should read --...from the <u>first</u> interface--

Claim 15, column 21, line 18: "d-1add code from the..." should read --d-1<u>)</u> add code from the...--

Signed and Sealed this

Eighth Day of July, 2008

JON W. DUDAS
*Director of the United States Patent and Trademark Office*